United States Patent [19]

Koizumi et al.

[11] Patent Number: 4,566,711
[45] Date of Patent: Jan. 28, 1986

[54] STEERING SYSTEM FOR VEHICLES

[75] Inventors: Yusuke Koizumi; Yoshimi Furukawa, both of Saitama; Shoichi Sano, Tokyo, all of Japan

[73] Assignee: Honda Giken Kogyo Kabushiki Kaisha, Tokyo, Japan

[21] Appl. No.: 661,680

[22] Filed: Oct. 17, 1984

[30] Foreign Application Priority Data

Oct. 17, 1983 [JP] Japan ................. 58-193669

[51] Int. Cl.⁴ ............................. B62D 7/00
[52] U.S. Cl. ....................... 280/91; 180/336
[58] Field of Search ............ 280/91, 96, 707, 99; 180/140, 141, 142, 143, 336, 170; 74/571 L, 831, 834, 836

[56] References Cited

U.S. PATENT DOCUMENTS 4,265,337  5/1981  Dammeyer ............... 180/170
4,363,973 12/1982  Kawata et al. .......... 180/170
4,506,899  3/1985  Sano et al. ............. 280/99

FOREIGN PATENT DOCUMENTS 26363  2/1984  Japan .

Primary Examiner—Joseph F. Peters, Jr.
Assistant Examiner—Ross Weaver
Attorney, Agent, or Firm—Irving M. Weiner; Joseph P. Carrier; John J. Cantarella

[57] ABSTRACT

A steering system for vehicles including a signal providing mechanism (34) for providing an information signal (Su) in relation to the vehicle speed, in which the steered angle ratio of a rear wheel (20) to a front wheel (7) is controlled to be variable in accordance with the information signal.

The signal providing mechanism comprises a sensor (34) adapted to detect the shift position of a speed change gear (33) of the vehicle.

In the steering system, the steered angle ratio of the rear wheel (20) to the front wheel (7) may be controlled to be variable in accordance with the vehicle speed, wherein the vehicle speed is detected by a cooperative combination of a sensor (34) for detecting the shift position of a speed change gear (33) of the vehicle and a sensor (43) for detecting the number of revolutions per minute of an engine (42) of the vehicle.

4 Claims, 13 Drawing Figures

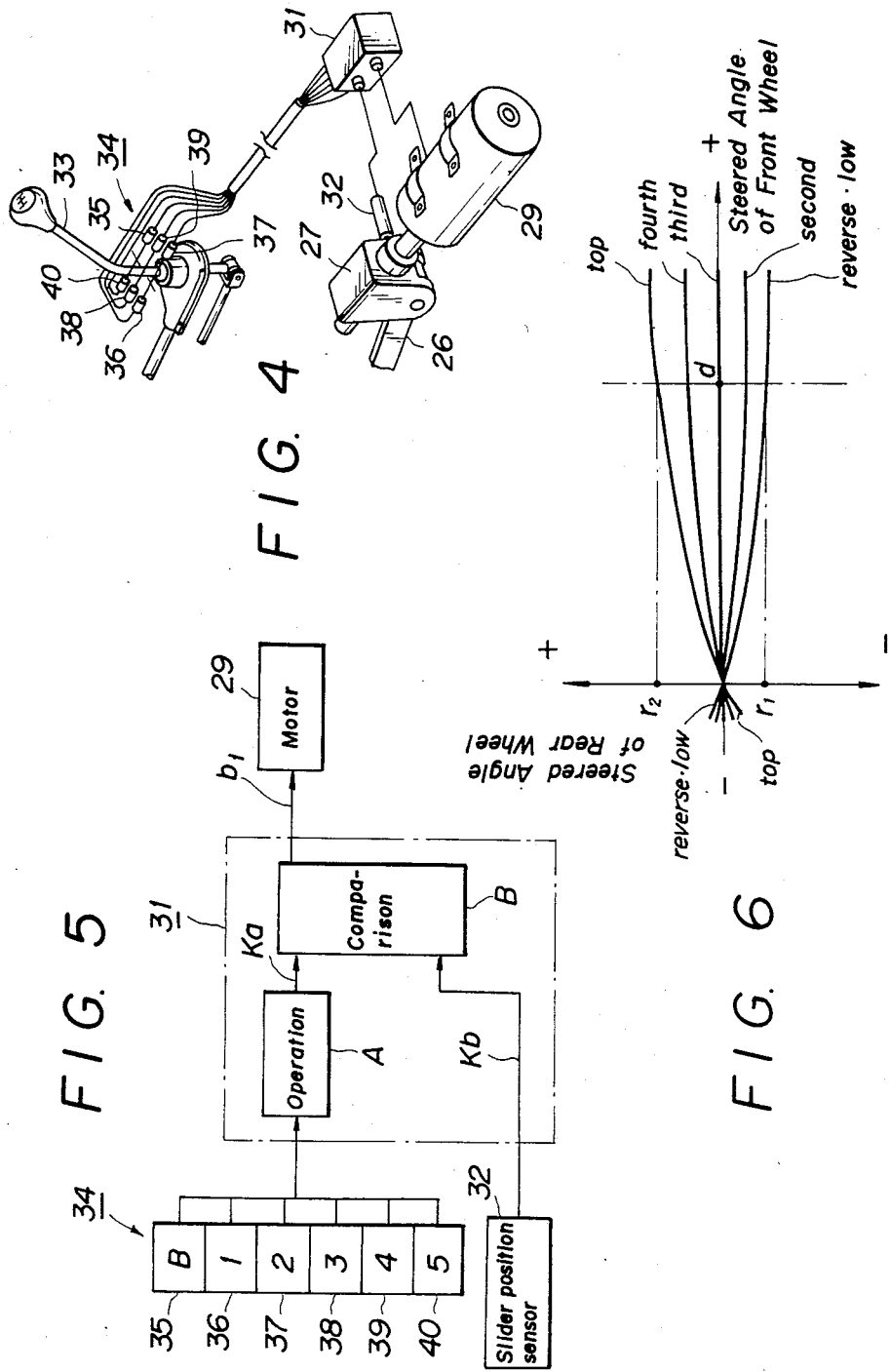

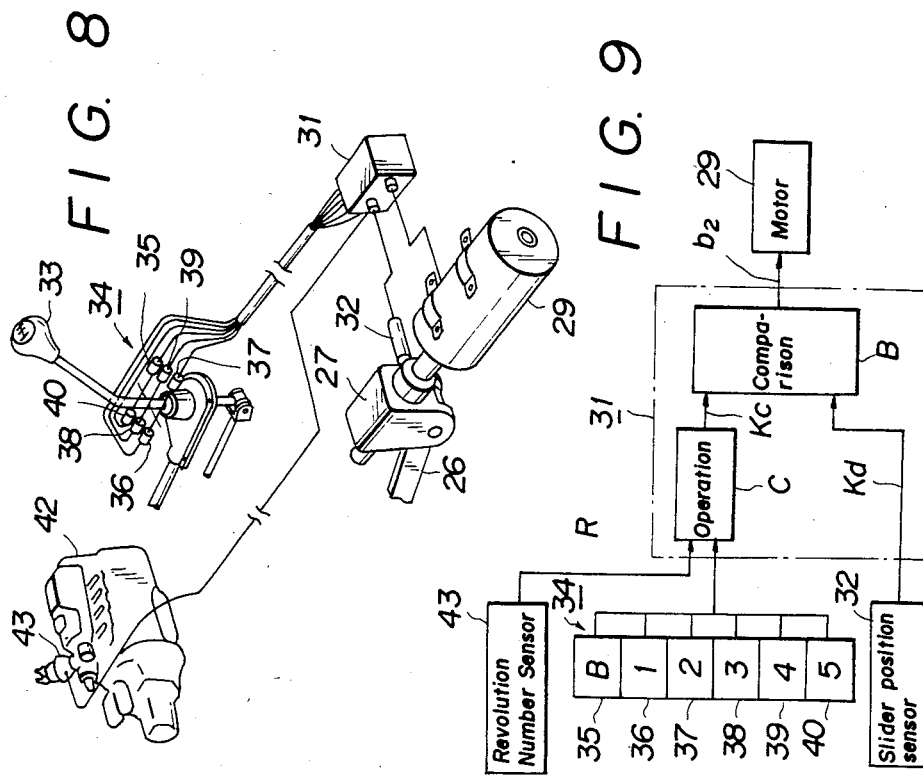
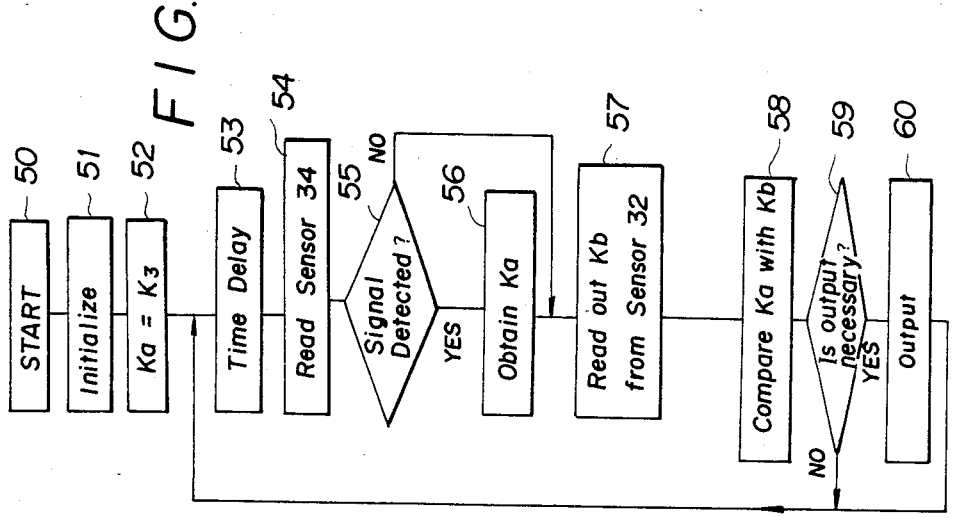

STEERING SYSTEM FOR VEHICLES

BACKGROUND OF THE INVENTION

1. Field of the Invention

The present invention relates to a steering system for vehicles of the type in which a rear wheel is steerable in relation to the steering operation of a front wheel.

2. Description of Revelent Art

There has already been proposed a steering system for vehicles in which a rear wheel is steerable in relation to the steering of a front wheel such that the steered angle ratio of the rear wheel to the front wheel is variable in accordance with the vehicle speed. (Japanese Laid Open Application No. JP-A-59-26363 dated Feb. 10, 1984).

More particularly, in this steering system, the rear wheel is steered, at relatively low vehicle speeds, in the opposite direction to the front wheel or substantially at an angle of zero degree and, at relatively high vehicle speeds, in the same direction as the front wheel. The steered angle ratio is given as a continuous function of the vehicle speed, as represented by a curve X shown in FIG. 11 of the accompanying drawings, such that for vehicle speeds higher than a predetermined vehicle speed $d_1$ the steered angle ratio is positive, that is, the front and rear steered angles are the same in phase, and for vehicle speeds lower than the predetermined vehicle speed $d_1$ the steered angle ratio is negative, that is, the steered angles are opposite in phase. In this manner, continuous control of the steered angle ratio is achieved to be effected along the function curve X, ranging from a low speed to a high speed. As a result, at relatively low vehicle speeds, the minimum turning radius of the vehicle as well as the inside wheel span is remarkably reduced, in addition to favorable vehicle turning characteristics such as when parking, travelling along a narrow curved road, and making a U-turn. Moreover, at relatively high vehicle speeds, the steering responsiveness can be highly improved.

Incidentally, in such steering system, in order to determine a proper possible steered angle ratio to be set in accordance with a signal corresponding to the vehicle speed, the speed the vehicle actually has is directly detected by a speed sensor as a signal source. However, in general, speed sensors available for such application tend to be complex in structure and consume an inordinate amount of space for installation, thus being disadvantageous in maintenance and cost effect. Moreover, in the case of a speed sensor with a continuous analog output, there may be required an additional element suc as an electric circuit for converting the analog output into a signal processable in a computer system for providing control.

With such point in mind, the present invention has been achieved to provide an improved in steering system for vehicles of the above-mentioned type.

SUMMARY OF THE INVENTION

According to the present invention, there is provided a steering system for vehicles including a steering wheel, a front wheel, a means for steering the front wheel, a rear wheel, a means for steering the rear wheel, a ratio changing means for changing the steered angle ratio of the rear wheel to the front wheel, a control means for controlling the ratio changing means, a ratio detecting means for detecting the steered angle ratio, the ratio detecting means cooperating with the control means, and a signal providing means for providing an information signal in relation to the vehicle speed, the signal providing means cooperating with the control means. The steered angle ratio is controlled to be variable in accordance with the information signal, and the signal providing means comprises a sensor means adapted for detecting the shift position of a speed change gear of the vehicle and connected to the control means.

Moreover, according to the present invention, there is provided a steering system for vehicles including a steering wheel, a front wheel, a means for steering the front wheel, a rear wheel, a means for steering the rear wheel, a ratio changing means for changing the steered angle ratio of the rear wheel to the front wheel, a control means for controlling the ratio changing means, a ratio detecting means for detecting the steered angle ratio, the ratio detecting means cooperating with the control means, and a speed detecting means for detecting the vehicle speed, the speed detecting means cooperating with the control means, in which the rear wheel is steered at relatively low vehicle speeds in the opposite direction to the front wheel or substantially at an angle of zero degree and at relatively high vehicle speeds in the same direction as the front wheel. The speed detecting means comprises a cooperative combination of a sensor means for detecting the shift position of a speed change gear of the vehicle and a sensor means for detecting the number of revolutions of an engine of the vehicle.

Accordingly, an object of the prssent invention is to provide a steering system for vehicles in which the steered angle ratio of a rear wheel to a front wheel is controlled to be variable by obtaining a signal carrying information in relation to the vehicle speed, with a simple constitution without a speed sensor, so that cost minimization can be successfully achieved as well as the greatest possible saving of installation space and facilitation of maintenance.

The above and further features, objects and advantages of the present invention will become apparent from the following detailed description of the preferred embodiments of the invention when the same is read in conjunction with the accompanying drawings.

BRIEF DESCRIPTION OF THE DRAWINGS

FIG. 4 is a constitutional illustration of a control part of a steering system for vehicles according to a first embodiment of the invention.

FIG. 5 is a functional block diagram of the control part of FIG. 4.

FIG. 6 is a graph showing steered angle of rear wheel vs. steered angle of front wheel characteristic curves of the steering system according to the first embodiment.

FIG. 7 is a schematic flowchart of a program for a micro-computer system of the control part of FIGS. 4 and 5.

FIG. 8 is a constitutional illustration of a control part of a steering system for vehicles according to a second embodiment of the invention.

FIG. 9 is a functional block diagram of the control part of FIG. 8.

DETAILED DESCRIPTION OF PREFERRED EMBODIMENTS

Figure 1:
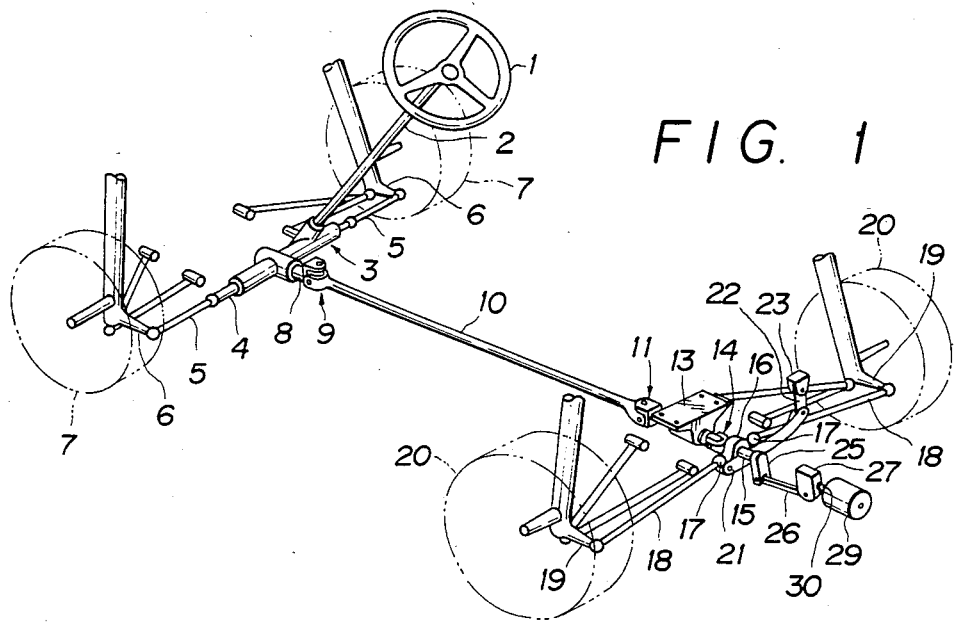
FIG. 1 is a schematic perspective view showing a basic structure of a vehicle equipped with a steering system to which respective embodiments of the present invention are applied.
Figure 2:
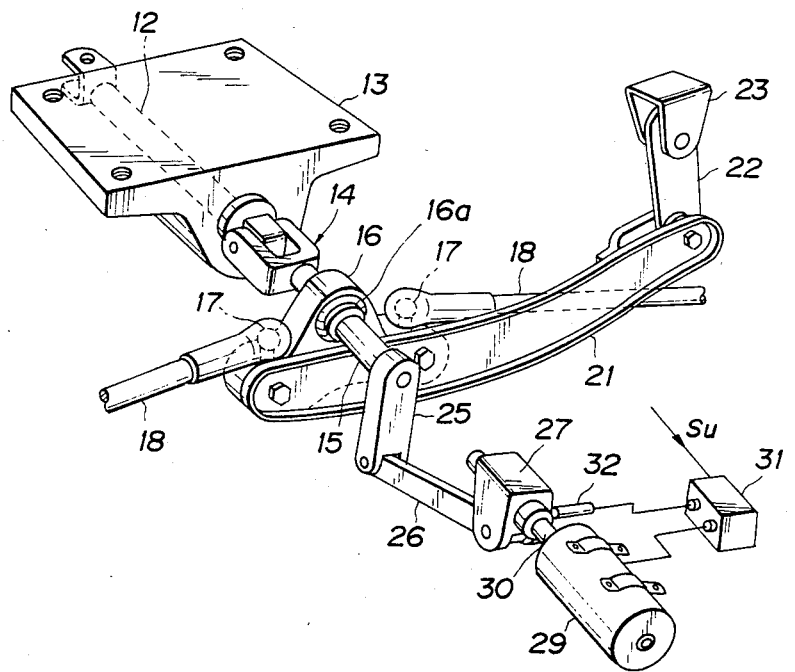
FIG. 2 is an enlarged perspective view of a rear wheel steering mechanism of the steering system of FIG. 1.

There will be described hereinbelow a pair of partially different steering systems for vehicles each respectively according to one of two embodiments of the present invention, which include a basic steering system substantially equivalent to that of the known steering system outlined hereinabove. FIGS. 1 and 2 show the arrangement of the basic steering system, the function of which will be described in detail hereinbelow in conjunction with FIGS. 3a to 3c.

Referring first to FIG. 1, designated at reference numeral 1 is a steering wheel. The steering wheel 1 is fastened to the upper end of a steering shaft 2 assembled at the lower end thereof in a gearbox 3 of a rack and pinion type, which has a rack shaft 4 connected at each transverse end thereof through one of a pair of tie rods 5, 5 to one of a pair of knuckle arms 6, 6 each respectively supporting one of a pair of front wheels 7, 7, to be steered in the same steering direction as the steering wheel 1, whereby a known front-wheel steering mechanism is constituted.

The gearbox 3 further has a pinion shaft 8 rearwardly projected therefrom, the shaft 8 being connected at the rear end thereof through a universal joint 9 to the front end of a relatively long linkage shaft 10, which in turn is connected at the rear end thereof to a later-described input shaft of a rear-wheel steering mechanism, the input shaft extending along the longitudinal centerline of a vehicle body (not shown) and being rotatably supported by means of a bearing bracket 13 secured to the vehicle body. The rear end of the input shaft is connected through a bifurcated joint 14 to a swingable shaft 15 having at the longitudinally middle part thereof a joint member 16 loosely fitted thereon. The joint member 16 is connected at each transverse end thereof through one of a pair of ball joints 17, 17 to the inner end of one of a pair of tie rods 18, 18, while being transversely and vertically swingably suspended from the vehicle body by means of a pair of link plates 21, 22 supported by a bracket 23. The tie rods 18, 18 are each respectively connected at the outer end thereof to one of a pair of knuckle arms 19, 19 which support a pair of rear wheels 20, 20, respectively.

Referring now to FIG. 2, the swingable shaft 15 has, at the longitudinally intermediate part thereof, a rotary part 16a of the joint member 16 fixedly fitted thereon and, at the rear end thereof, an arm member 25 secured thereto at the upper end thereof so as to be kept perpendicular to the swingable shaft 15. To the lower end of the arm member 25 is pivotably connected the front end of a link 26, which in turn is pivotably connected at the rear end thereof to a slider 27 screw-feedably fitted, by means of a ball and screw mechanism 28 shown in FIGS. 3a to 3c, on an output shaft 30 of a control motor 29. The motor 29 is fixed to the vehicle body so that the output shaft 30 extends in alignment with the above-mentioned input shaft, which is designated at reference numeral 12 in FIG. 2.

Moreover, the vehicle has mounted thereon a microcomputer 31 receiving a later-described signal from a slider position sensor 32 detecting the screw-fed position of the slider 27 and a shift position signl Su from a later-detailed shift position sensor 34 (FIG. 4) detecting the shift position of a 5-speed, 1-reverse shift lever 33, which shift position corresponds to that of a speed change gear (not shown) of the vehicle. From this computer 31, the control motor 29 is supplied with a later-described control signal corresponding to the shift position of the lever 33 or that of the speed change gear.

In the above arrangement, a mechanism for changing the steered angle ratio of the rear wheels 20, 20 to the front wheels 7, 7 is constituted by the swingable shaft 15, the joint member 16, the arm member 25, the link 26, the slider 27, the motor 29, and the output shaft 30.

Figure 3A:
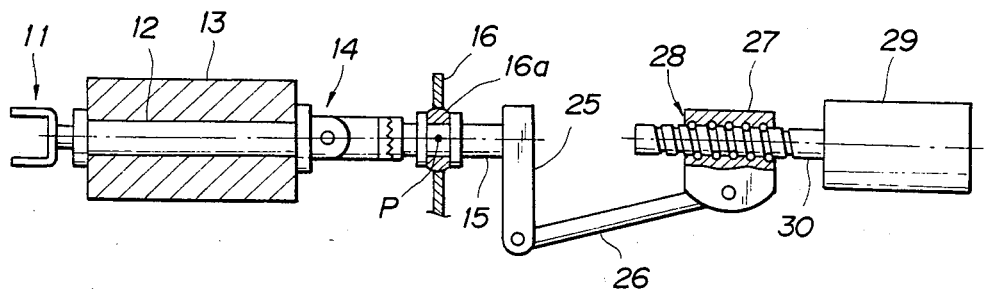
FIGS. 3a to 3c are longitudinal sectional side views, for functional explanation, of an essential part of the rear wheel steering mechanism of FIG. 2.
Figure 3B:
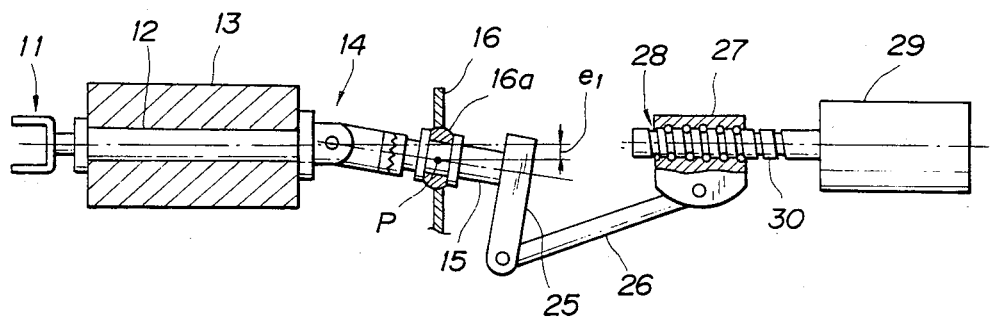
Figure 3C:
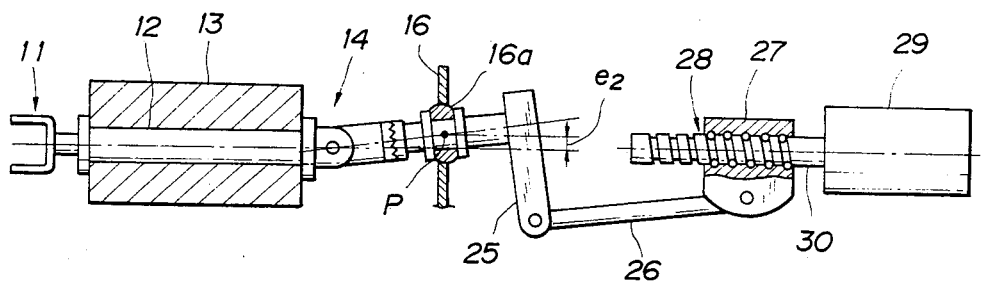

Referring now to FIGS. 3a to 3c, the steered angle ratio changing mechanism will be described below with respect to the function thereof.

When the shift lever 33 is put in a middle or third-speed position thereof which is relatively large with regard to the speed reduction ratio, the slider 27 is located at a position shown in FIG. 3a and hence the joint member 16 has a pivot point P thereof on the extension of the axis of the input shaft 12. In such case, the swingable shaft 15 is permitted to coaxially rotate with the input shaft 12, so that, even in the case where the swingable sahft 15 is rotated, the joint member 16 will not laterally swing, thus being kept from actuating the left and right rear tie rods 18, 18. Accordingly, when operated, the steering wheel 1 will steer only the front wheels 7, 7, leaving the rear wheels 20, 20 substantially unsteered.

On the other hand, when the shift lever 33 is in one of those shift positions which is relatively large with regard to the speed reduction ratio, i.e., in a second-speed position thereof, a low-speed position thereof, or a reverse position thereof, the computer 31 receiving the shift position signal Su from the shift position sensor 34 makes a judgment, which causes the motor 29 to be controlled in the number of revolutions thereof in response to the detected shift position, whereby the slider 27 is advanced as shown in FIG. 3b from the position thereof in FIG. 3a. At such relatively low speeds, the resultant advance of the slider 27 makes the swingable shaft 15 incline downwardly, thereby downwardly offsetting the pivot point P by a distance $e_1$ from the axis level of the input shaft 12. Accordingly, when operated, the steering wheel 1 causes the rotary part 16a of the joint member 16 to be laterally swung under a horizontal plane including the axis of the input shaft 12, thereby bringing the rear tie rods 18, 18 in the opposite direction to the front tie rods 5, 5, so that the rear wheels 20, 20 are steered oppositely to the front wheels 7, 7, while the steered angle ratio between the front and rear wheels 7, 7 and 20, 20 is substantially proportional to the offset distance $e_1$ which varies stepwise depending on the shift position of the shift lever 33.

To the contrary, when the shift lever 33 is in one of those shift positions which is relatively small with regard to the speed reduction ratio, i.e., in a fourth-speed position thereof or a top position thereof, the computer 31 causes the motor 29 to be reversed in accordance with the shift position of the shift lever 33, so that the slider 27 is retreated as shown in FIG. 3c from the position thereof in FIG. 3a. At such relatively high speeds, the resultant retreat of the slider 27 makes the swingable shaft 15 incline upwardly, thereby upwardly offsetting the pivot point P by a distance $e_2$ from the axis level of the input shaft 12. Accordingly, when operated, the steering wheel 1 causes the rotary part 16a of the joint member 16 to be laterally swung under the horizontal plane including the axis of the input shaft 12, thereby bringing the rear tie rods 18, 18 in the same direction as the front tie rods 5, 5, so that the rear wheels 20, 20 are steered in the same direction as the front wheels 7, 7, while the steered angle ratio therebetween is substantially proportional to the offset distance $e_2$ which also varies stepwise depending on the shift position of the shift lever 33.

Incidentally, the computer 31 comprises a microcomputer system including, but not limited to, a plurality of integrated circuits (not shown) such as a CPU, a ROM, a RAM, and a plurality of peripheral interfaces.

There will be described hereinbelow the essential arrangement as well as the function of a control part of the steering system according to the first embodiment, with reference to FIGS. 4 to 7.

Referring now to FIG. 4, the shift position sensor 34 detecting the shift position of the shift lever 33 is disposed in the vicinity of the lower part of the shift lever. 33. The sensor 34 comprises a sextuple of shift position detecting elements 35 to 40 adapted in order of their reference numerals to detect the reverse position, the low-speed position, the second-speed position, the third-speed position, the fourth-speed position, and the top position of the shift lever 33 in a one-to-one correspondence manner. Each of the detecting elements 35 to 40 comprises a mechanicaly operated switch (not shown) such as a micro-switch directly operable by shifting the lever 33, whereas such element may comprise an optical sensor with an optical path to be shut or open when the lever 33 is shifted into one of the six shift positions thereof. The detecting elements 35 to 40 are electrically connected to the computer 31.

Referring now to FIG. 5, which shows a functional block diagram of the the control part of the steering system including the computer 31 functioning for the control of steered angle ratio, the shift position sensor 34 detecting the shift lever 33 as put in a particular shift position thereof has output to the computer 31 the shift position signal Su as given from a corresponding one of the detecting elements 35 to 40, which signals Su is identified for the particular shift position by a suitable means such as an additional detector or an independent connection of signal lines, thereby obtaining an identified shift position signal which is processed in the computer 31 by an operation A to determine a proper steered angle ratio Ka as a predetermined reference value corresponding to the detected shift position. On the other hand, the slider position sensor has output to the computer 31 a signal, as before-mentioned, representing an actual steered angle ratio Kb, which is subjected to a comparison B with the ratio Ka to determine the degree necessary for correction of the steered angle ratio. Then, information on the necessary correction is given in the form of a correction command signal $b_1$ to the control motor 29, to thereby correct the steered angle ratio in accordance with the shift position of the shift lever 33.

FIG. 6 is a graph showing a plurality of steered angle of rear wheel vs. steered angle of front wheel curves characteristic of the shift positions of the shift lever 33.

As shown in FIG. 6, when the front wheels 7, 7 are steered by an arbitrary positive angle d, the rear wheels 20, 20 are steered by a negative angle $r_1$, i.e. in the opposite direction to the front wheels 7, 7, while the shift lever 33 is put in the low-speed position, and by a positive angle $r_2$, i.e. in the same direction as the front wheels 7, 7, while the lever 33 is in the top position. Likewise, for positive steered angles of the front wheels 7, 7, the steered angle of the rear wheels becomes negative in the second-speed position and positive in the fourth-speed position while it remains substantially zero in the third-speed position. For negative steered angles of the front wheels 7, 7, the above-described signs of the steered angle of the rear wheels all reverse, so that the sign of the steered angle ratio remains unchanged in each shift position, including the reverse position which provides the same steered angle ratio as that of the low-speed position.

Due to the discontinuity of the step-functional shift positions, the steered angle ratio available as a substantially uniform function of the shift position constitutes a set of discrete values, whereas the balance between the degree of such discreteness and the practicability can be overcome in relation to the number of shift positions and, in the case of five shift positions to be provided in the forward gearing as in the foregoing embodiment of the invention, a successful result can be obtained. In this respect, there may be employed a delay circuit to pass the output signal of a shift position sensor, to thereby moderate the discontinuity of such signal. Incidentally, in the foregoing embodiment, the steered angle ratio is kept, as it has been, when the shift lever 33 is put in an intermediate or neutral position.

FIG. 7 is a rough flowchart showing a control program stored in the ROM as a memory of the microcomputer system governing the above-described processes in the computer 31.

As seen from FIG. 7, the control program starts at a stage 50 when the control part of the steering system is powered on or reset, and goes to an initializing stage 51 for initializing peripheral devices to set necessary variables. Then, at a stage 52, as the proper reference ratio Ka, there is set for the time being a steered angle ratio $k_3$ corresponding to the third-speed position of the shift lever 33.

Therefore, the program flow enters a base loop comprising a plurality of stages 53 to 60.

At the first stage 53 of the base loop, the flow elapses a time period of two seconds, before interrogating to read at a stage 54 the first position sensor 34 for a signal of a lever position detected by the sensor 34. At a decision stage 55 next thereto, it is judged whether or not the this lever position signal is identifiable of any of the six shift positions of the shift lever 33. When the lever position signal is so identifiable, a new steered angle ratio is obtained to be set at a stage 56, as the reference ratio Ka in accordance with the identified shift position. In the case where the lever position signal is not so identifiable, as well as when the stage 56 has completed the process thereof, the program flow proceeds to a stage 57.

At the stage 57, an actual steered angle ratio Kb through the slider 27 is read from the slider position sensor 32. At a stage 58 next thereto, the actual ratio Kb is compared with the reference ratio Ka. The result of this comparison is used at a subsequent decision stage 59 for the judgment whether or not the output of the correction command signal $b_1$ is necessary. When judged necessary, the command signal $b_1$ is output to the control motor 29 at the last stage 60 of the base loop, to thereby correct the position of the slider 27, establishing a proper steered angle ratio in accordance with the shift position of the shift lever 33. In the case where such an output to the motor 29 is judged unnecessary at the decision stage 59, the program flow goes to the above-mentioned stage 53, as well as when the process at the last stage 60 is completed.

There will be described hereinbelow the arrangement and function of a control part of a steering system for vehicles according to the second embodiment of the invention, with reference to FIGS. 8 to 10, in which for the convenience of comprehension like parts are designated by like reference characters in relation to the first embodiment.

Referring now to FIG. 8, designated at reference numeral 42 os am engine unit. The engine unit 42 is provided with a revolution number sensor 43 for detecting the number of revolutions per minute of the engine unit 42, which sensor 43 may have a pickup cooperating with a rotary disc on a crankshaft. Together with a shift position sensor 34, the revolution number sensor 43 is connected to a computer 31.

Figure 11:
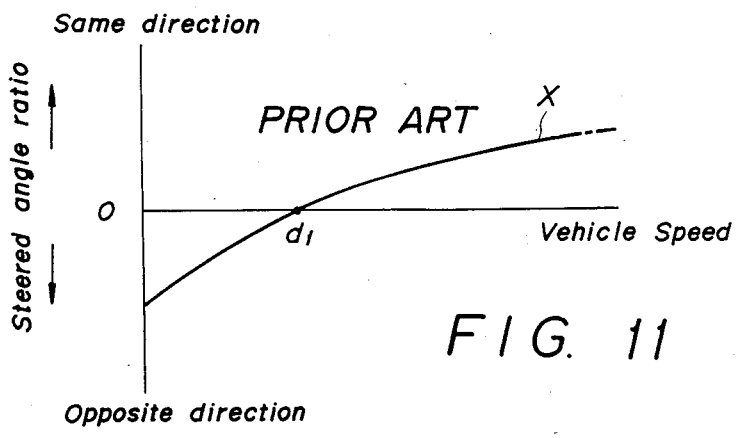
FIG. 11 is a graph showing a steered angle ratio vs. vehicle speed characteristic curve of a conventional steering system.

Referring now to FIG. 9, the computer 31 has input therein from the shift sensor 34 a shift position signal identifiable of the shift position of a shift lever 33 and from the revolution number sensor 43 a revolution number signal representing a number of revolutions per minute R the engine unit 42 then has. In the computer 31, the shift position signal and the revolution number signal are processed by an operation C to deterimine from the number of revolutions R conditioned by the shift position a false vehicle speed V, which is approximate to the speed the vehicle actually has and not step-functional but substantially continuous, and from the false speed V a reference ratio Kc which is then proper as the steered angle ratio of the vehicle, so that the relation the reference ratio Kc has to the actual vehicle speed is substantially the same as that the curve X of FIG. 11 has.

The computer 31 has further input therein from a slider position sensor 32 an actual ratio signal representing an actual steered angle ratio Kd of the vehicle. Then, by way of a comparison B of this actual ratio Kd with the reference ratio Kc, a correction command signal $b_2$ is given to a control motor 29, when necessary, to properly correct the steered angle ratio in accordance with the false speed V.

Incidentally, the revolution number signal from the revolution number sensor 43 is given in the form of a pulse for the facilitation of process in the computer 31.

As will be understood from the foregoing description, accordance to the second embodiment, a false speed approximating the actual vehicle speed is obtainable with a simple constitution without using a conventional speed sensor disadvantageous in cost, while achieving a performance substantially equivalent to the level of that obtained in the art, thus favorably improving the cost effect.

An additional improvement in the reliability of speed detection may be obtained by employing a speed sensor for directly detecting the actual vehicle speed, together with the combination of a shift position sensor and a revolution number sensor.

Figure 10:
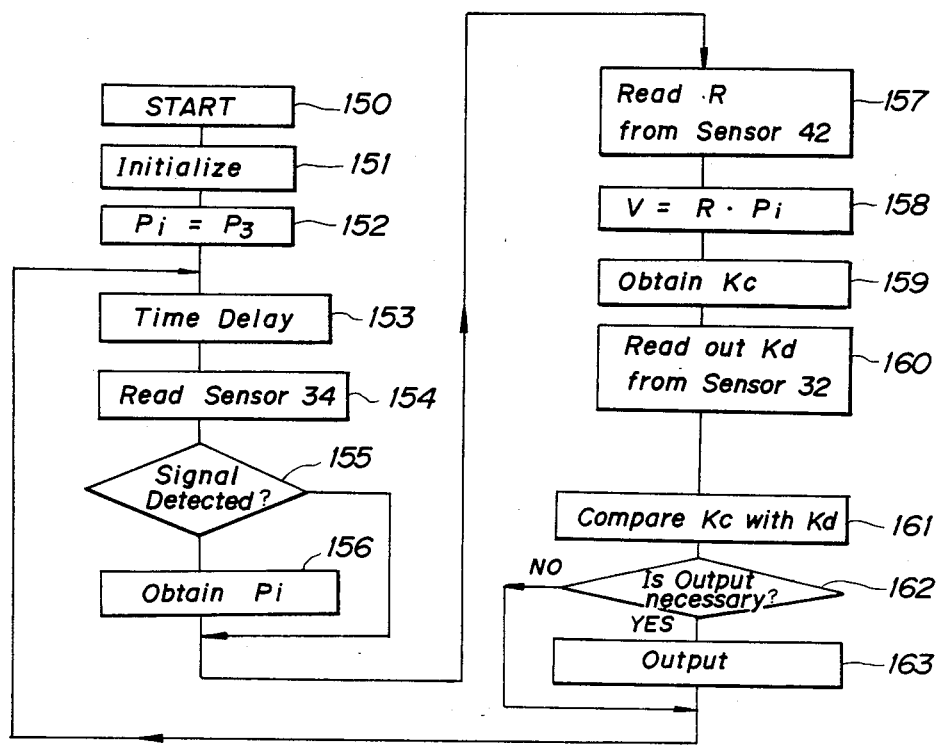
FIG. 10 is a schematic flowchart of an essential part of a program for a microcomputer system of the control part of FIGS. 8 and 9.

FIG. 10 is a rough flowchart showing a control program stored in a ROM as a memory of a microcomputer system governing the above-described processes in the computer 31.

As seen from FIG. 10, the control program starts at a stage 150 when the control part of the steering system is powered on or reset, and goes to an initializing stage 151 for initializing peripheral devices to set necessary variables. Then, at a stage 152, as a proportional parameter Pi predetermined in accordance with the shift position of the shift lever 33, there is set for the time being a parameter P3 corresponding to a thirdspeed position of the shift lever 33.

Thereafter, the program flow enters a base loop comprising a plurality of stages 153 to 163.

At the first stage 153 of the base loop, the flow elapses a time period of two seconds, before interrogating to read at a stage 154 the shift position sensor 34 for a signal of a lever position detected by the sensor 34. At a decision stage 155 next thereto, it is judged whether or not this lever position signal is identifiable of any of the six shift positions of the shift lever 33. When the lever position signal is so identifiable, a new parameter Pi is obtained to be set at a stage 156, as the proportional paramemter Ka in accordance with the identified shift position. In the case where the lever position signal is not so identifiable, as well as when the stage 156 has completed the process thereof, the program flow proceeds to a stage 157.

At the stage 157, a number of revolutions per minute R the engine unit 42 then has is read from the revolution number sensor 43. At a stage 158 next thereto, the number of revolutions R is multiplied by the new parameter Pi to obtain a false speed V. Then, at a stage 159, a reference ratio Kc is obtained in correspondence to the false speed V.

Thereafter, at a stage 160, an actual steered angle ratio Kd through the slider 27 is read from the slider position sensor 32. At a stage 161 next thereto, the actual ratio Kd is compared with the reference ratio Kc. The result of this comparison is used at a subsequent decision stage 162 for the judgment whether the output of the correction command signal $b_2$ is necessary or not. When judged necessary, the command signal $b_2$ is output to the control motor 29 at the last stage 163 of the base loop, to thereby correct the position of the slider 27, letting the steered angle ratio be Kc. In the case where such an output to the motor 29 is judged unnecessary at the decision stage 162, the program flow goes to the above-mentioned stage 153, as well as when the process at the last stage 160 is completed.

As will be understood from the description heretofore, in a steering system for vehicles according to the present invention, there is provided a distinctive implement for obtaining a fictitious or false signal in relation or correspondence to the vehicle speed to determine therefrom a possibly proper steered angle ratio with respect to the speed the vehicle than has, without the conventional direct detection by a speed senor, which implies the possibility of a wide range of application such that, for example, in a vehicle equipped with an automatic transmission, there may be employed as such implement a pressure sensor for detecting a governor pressure which is substantially continously variable with the vehicle speed.

Particularly, in the preferred embodiments, there is employed a shift position sensor to be disposed in the vicinity of a shift lever, where the space is quite feasible for installation and easily accessible for maintenance.

Moreover, the present invention may be embodied as a steering system including front and rear wheels having hydraulically controlled of the steering in which information on the steered angle of the front wheel is hydraulically transmitted, or as a steering system in which the steered angle of a front wheel is directly informed to a computer by means of an electric signal.

Incidentally, in the preferred embodiments, the computer 31 may be replaced by a compatible electric circuit. Further, a shift position signal may be directly taken out of a transmission.

Furthermore, to aid in obtaining a reference steered angle ratio, there may be favorably employed a signal representing the on-off status of a clutch and/or a brake.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A steering system for vehicles including a steering wheel, a front wheel, means for steering said front wheel, a rear wheel, means for steering said rear wheel, ratio changing means for changing the steered angle ratio of said rear wheel to said front wheel, control means for controlling said ratio changing means, ratio detecting means for detecting the steered angle ratio, said ratio detecting means cooperating with said control means, signal providing means for providing an information signal in relation to the vehicle speed, and said signal providing means cooperating with said control means, in which the steered angle ratio is controlled to be variable in accordance with said information signal, wherein said signal providing means comprises sensor means adapted for detecting the shift position of a speed change gear of the vehicle and connecting to said control means.

2. A steering system according to claim 1, wherein said sensor means comprises a sensor for detecting the shift position of a shift lever of the vehicle, and wherein the steered angle ratio is controlled to be negative or substantially zero when said shift lever is put in a shift position thereof having a relatively large speed reduction ratio and positive when the same is put in a shift position thereof having a relatively small speed reduction ratio.

3. A steering system for vehicles including a steering wheel, a front wheel, means for steering said front wheel, a rear wheel, means for steering said rear wheel, ratio changing means for changing the steered angle ratio of said rear wheel to said front wheel, control means for controlling said ratio changing means, ratio detecting means for detecting the steered angle ratio, said ratio detecting means cooperating with said control means, speed detecting means for detecting the vehicle speed, and said speed detecting means cooperating with said control means, in which said rear wheel is steered at relatively low vehicle speeds in the opposite direction to said front wheel or substantially at an angle of zero degree and at relatively high vehicle speeds in the same direction as said front wheel, wherein said speed detecting means comprises a cooperative combination of sensor means for detecting the shift position of a speed change gear of the vehicle and sensor means for detecting the number of revolutions of an angle of the vehicle.

4. A steering system according to claim 3, wherein said sensor means for detecting the shift position comprises a sensor for detecting the shift position of a shift lever of the vehicle.

* * * * *